May 12, 1953  W. D. LUDWIG  2,638,122
VALVE

Filed Feb. 18, 1948  2 Sheets-Sheet 1

INVENTOR.
WALTER D. LUDWIG.
BY
Thos L Donnelly
ATTORNEY.

May 12, 1953     W. D. LUDWIG     2,638,122
VALVE
Filed Feb. 18, 1948     2 Sheets-Sheet 2
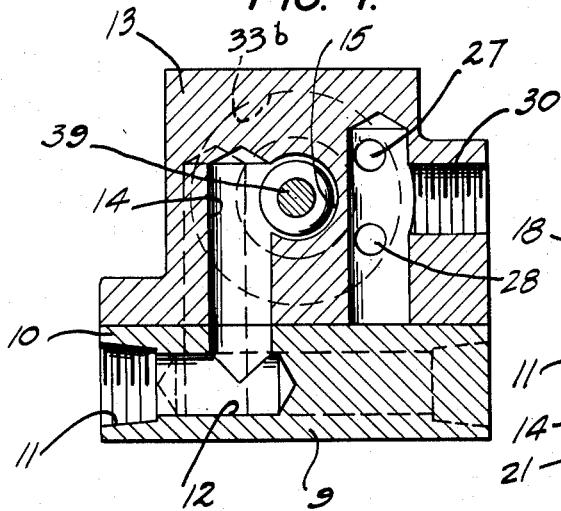
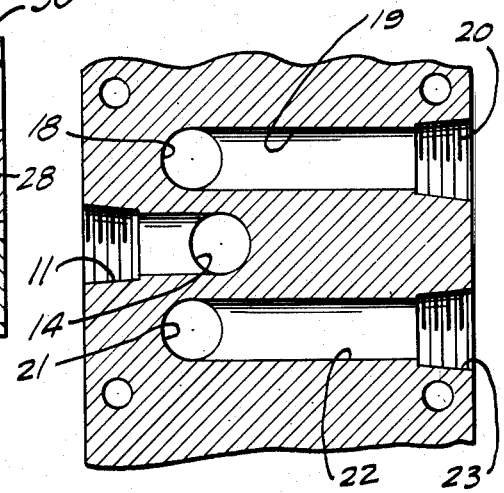
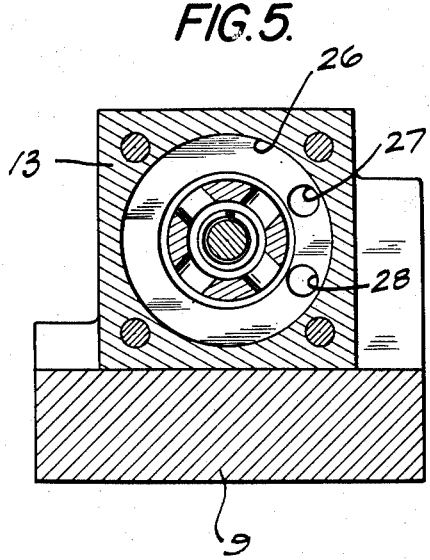
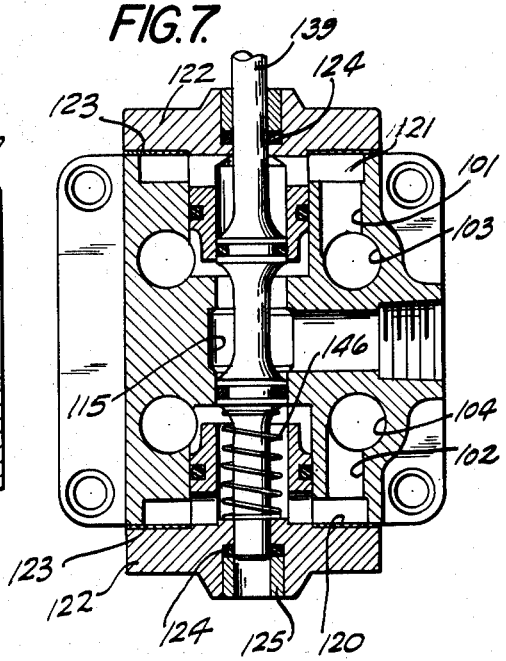
INVENTOR.
WALTER D. LUDWIG.
BY
*(signature)*
ATTORNEY Patented May 12, 1953

2,638,122

UNITED STATES PATENT OFFICE 2,638,122

VALVE

Walter D. Ludwig, Detroit, Mich.

Application February 18, 1948, Serial No. 9,222

9 Claims. (Cl. 137—623)

My invention relates to a new and useful improvement in a valve for controlling flow of fluid to a double acting cylinder.

It is an object of the present invention to provide a valve of this class which will be simple in structure, economical of manufacture, durable, light, compact, and highly efficient in use.

Another object of the invention is the provision of a valve of this class having a reciprocating control member carrying a seal adapted for sealing at spaced apart points and traveling over a gap from one point to another.

Another object of the invention is the provision in a valve of this class of a structure whereby the reciprocating member may have a minimum stroke of travel.

Another object of the invention is the provision of a valve construction of this type in which obstructions to the ready flow of the fluid, such as air or liquid, are eliminated and the air or liquid in passing through the valve is brought into contact with curved surfaces, thus adding to the efficiency of the mechanism.

Another object of the invention is the provision of a valve construction having cast parts so constructed and arranged that all coring is reduced to a minimum.

Another object of the invention is the provision of a valve of this class which will be quick acting.

Another object of the invention is the provision of a valve of this class so arranged and constructed that the pressure drop in the valve may be reduced to a minimum.

Another object of the invention is the provision of a valve of this type of a construction which will effect a maximum passage of air therethrough and produce a speedily operated valve in which the use of a pilot valve is eliminated and the power necessary to operate the solenoid is reduced to a minimum.

Other objects will appear hereinafter.

It is recognized that various modifications and changes may be made in the detail of structure illustrated without departing from the invention and it is intended that such shall be embraced within the scope of the claims which form a part hereof.

Figure 1:
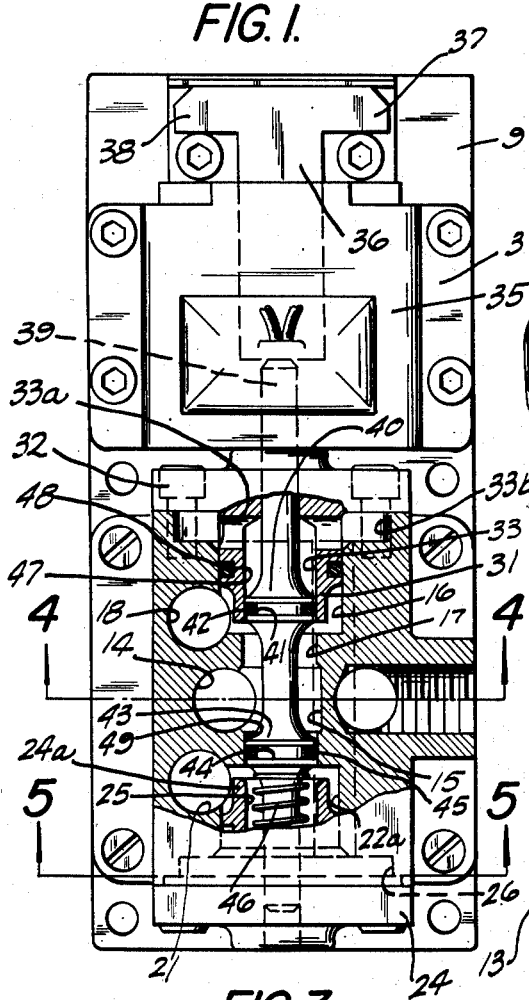
Figure 2:
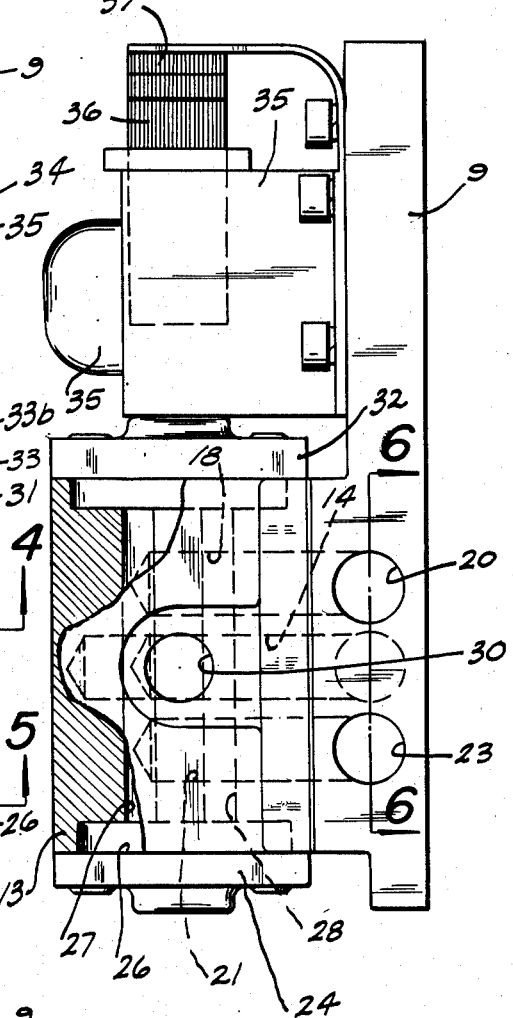
Figure 3:
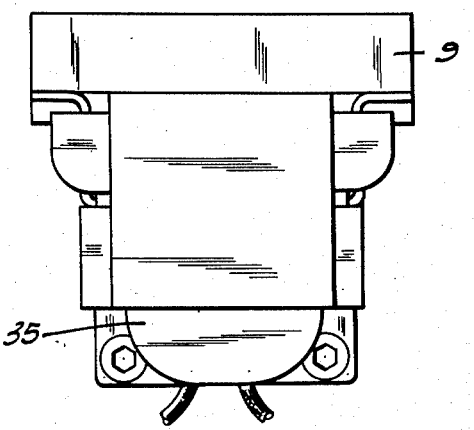

Forming a part of this specification are drawings in which,

Fig. 1 is a front elevational view with parts broken away and parts shown in section, Fig. 2 is a side elevational view with parts broken away and parts shown in section, Fig. 3 is an end elevational view of the invention, Fig. 4 is a sectional view taken on line 4—4 of Fig. 1, Fig. 5 is a sectional view taken on line 5—5 of Fig. 1, Fig. 6 is a fragmentary, sectional view taken on line 6—6 of Fig. 2, Fig. 7 is a longitudinal, sectional view showing a slight modification of the invention.

As shown in the drawings, I provide a base 9 having a nipple 10 projecting outwardly from one side thereof and bored and internally threaded at 11 for reception of a conduit which will serve to conduct the air or liquid into the valve. This inlet port 11 communicates with the passage 12 which is in communication with the passage 14 formed in the block or valve housing 13 which is mounted on the base 9. This passage 14, which is shown in Fig. 4, communicates with the central or inlet chamber 15, also shown in Fig. 1. The chamber 15 is in communication through the passage 17 with an intermediate 16. Communicating with an intermediate 16 is the passage 18, shown in Fig. 1, and which, as shown in Fig. 6, communicates with the delivery passage 19 having an internally threaded port 20 in which may be secured a suitable delivery conduit for delivery of the fluid. The fluid flowing through the passage 19 will flow in both directions, the pressure fluid flowing to the right and the exhaust fluid flowing to the left through passage 19.

The chamber 15 communicates through the passage 49 with the intermediate chamber 22a which is in communication with the passage 21, as shown in Fig. 1. As shown in Fig. 6, this passage 21 is in communication with the passage 22 having the internally threaded port 23 through which may be attached one end of the delivery conduit. This passage 22 functions as does the passage 19, the fluid under pressure flowing to the right and the exhaust fluid flowing to the left.

Secured to one end of the housing is a cap 24 having a sleeve 24a projecting centrally inwardly therefrom and sealed at its periphery against the side walls of the chamber 22a is suitable sealing material, its method of sealing being illustrated at the opposite end of the housing and the sealing material corresponding to the sealing material 48, shown at the opposite end of the housing. Surrounding the sleeve 24a, and in communication with the interior 25 thereof, is an end chamber 26 with which communicates one end of each of the passages 27 and 28 which extend longitudinally of the housing. An exhaust port 30 is drilled into the housing from one side so as to break into each of the passages 27 and 28 and communicate therewith. As shown in Fig. 4, this exhaust port 30 is internally threaded for reception of a pipe or suitable conduit.

Mounted on the opposite end of the housing is an end cap 32 projecting centrally inwardly from which is the sleeve 31, the interior 33 of which is adapted to communicate through the lateral opening 33a with the end chamber 33b corresponding to the chamber 26 and which is also in communication with the passages 27 and 28. Formed in the periphery of the sleeve 31 is an annular groove 47 in which a sealing strip 48 is mounted to seal against the inner surface of the chamber 16.

Mounted on the base 9, at the flanges 34, is a suitable solenoid 35 having a core 36 provided with the laterally extending arms 37 and 38. This core 36 is adapted to contact one end of the valve stem 39 which slidably projects into the solenoid and which slidably projects exterior of the valve housing through the end cap 32 when in the position shown in Fig. 1, also through the end cap 24 when it is in its opposite position.

Formed on the valve stem 39, intermediate its ends, is an enlargement or valve spool 40 which is bell-shaped on its ends and which is provided between its opposite ends with the annular groove 41 in which is inserted a sealing strip 42 adapted to seal against the interior 33 of the sleeve 31 and, also, adapted to engage the inner surface of the passage 17 and sealed thereagainst. A similar enlargement or valve spool 43 is formed intermediate the ends of the stem 39, the enlargement being spaced apart as shown in Fig. 1. The enlargement 43 is formed bell-shaped on its opposite ends and is provided with the annular groove 44 in which is engaged the strip or sealing material 45 which serves to seal against the inner surface of the passage 49 and, also, against the interior surface 25 of the sleeve 24a. A spring 46 embraces the rod 39 at one end and is adapted to normally maintain the stem or rod 39 forced upwardly into the position shown in Fig. 1. When the solenoid is energized, the core 36 will move downwardly so as to move the rod 39 downwardly and the enlarged portion 43 would then occupy the corresponding position to the position occupied by the enlarged portion 40 and the portion 40 would move into a corresponding position to that now occupied by the enlarged portion 43. These enlarged portions may be termed valves which are mounted on the stem 39.

In use, the valve would be connected in a pressure line in such a manner that the fluid under pressure would be delivered through the port 11. The ports 20 and 23 would be connected to opposite ends of a double acting cylinder and the port 30 would be connected to an exhaust conduit. The fluid entering the inlet port 11 would pass into a passage 14. As shown in Fig. 1, this passage 14 communicates with the chamber 15 which is shut off from communicating with the chamber 22a by the sealing strip 45. The fluid, therefore, would pass through the passage 17 into the chamber 16 and into the passage 18 and thence through the passage 19 through the delivery port 20 to one end of the cylinder so that the fluid under pressure would be delivered outwardly to the right through passage 19. The exhaust fluid from the opposite end of the cylinder would then enter the port 23 and travel through the passage 22 and the passage 21 into the chamber 22a so as to communicate with the interior 25 of the sleeve 24a. The interior of this sleeve 25 is in communication with the chamber 26 with which the passages 27 and 28 communicate so that the fluid may thus flow through the exhaust 30.

At the proper position of movement of the piston in the double acting cylinder, a solenoid would be energized so that the valve stem 39 would be moved downwardly from the position shown in Fig. 1. When moved downwardly, the sealing strip 42 would seal against the inner face of the passage 17 and the sealing strip 45 would seal against the inner surface 25 of the sleeve 24a. With a pipe thus arranged the fluid under pressure entering through the port 11 and passing upwardly in the passage 14 would be sealed against communication with the chamber 16 but would be in communication with the chamber 22a and the fluid would thus travel through the passage 21 and the passage 22 through the outlet port 23 to the opposite end of the cylinder, the return being through the passage 19. From the energizing of the solenoid the spring 46 would restore the valve stem to the position shown in Fig. 1.

It will be noted that there are no sharp corners or obstructions to interfere with the flow of the fluid. This is particularly so at the enlargements 40 and 43 with the result that a free and easy flow of the fluid becomes possible and an easy operation of the valve accomplished.

The principle of the valve is not limited to electric solenoid operation. It is believed that it will appear obvious that a suitable mechanical means of operation may be used for controlling the piston or that it may be controlled by hand, foot or in any other suitable manner so long as the sliding movement is effected.

The valve may also be constructed so as to obtain a neutral position, that is, the pressure inlet may be isolated from both outlet ports simultaneously and, at the same time, leaving both outlet ports open to exhaust. To achieve this, the passages 17 and 49 would have to be lengthened so that both piston seals, when in neutral, would remain in contact with these passages. From this neutral position, a downward movement of the piston would open the lower end and seal the exhaust and an upward movement from neutral would open the upper end and seal the exhaust above.

In addition to these variations, this valve structure may be readily adapted to a five port construction without altering the basic pattern and this I have illustrated in Fig. 7. This construction is desirable in certain application where high and low pressures are required. The five ports consist of two pressure inlets and two outlets and the common exhaust. Two end chambers 120 and 121 become pressure chambers and communicate with the inlet ports in the base through the passage 101 (which may be termed the low side) and 102 (which may be termed the high side) and from these passages downwardly through the passages 103 and 104, respectively. The outlet or cylinder ports remain the same as in the four port construction illustrated. The common exhaust port is also the same except that it communicates directly with the inlet chamber 115 corresponding to chamber 15 in the form shown in Fig. 1. Inasmuch as the chambers 120 and 121 are now pressure chambers, the end caps 122 are sealed by the gasket 123. The sealing ring 124 embraces the stem 139, these sealing rings 124 being held in position by the bushing 125 which are resorted to for facilitating the manufacture of the structure. The spring 146 is lighter than the spring 46 because it is positioned on the high pressure side. It is believed obvious that the basic construction is such that the ports may open through the bottom, as well as through the sides of the base. Another feature of the structure is that in proceeding to a larger or a smaller capacity valve, the size is increased or diminished proportionately in all respects. This is not possible in most valve constructions of a competitive nature.

What I claim is:

1. A valve construction of the class described comprising a valve housing and having an inlet chamber formed therein, an inlet port communicating with said chamber, a pair of intermediate chambers one being positioned at each side of said first named chamber, a passage at opposite ends of said inlet chamber, each communicating said inlet chamber with one of said intermediate chambers, a pair of outlet delivery conduits each in constant communication with one of said intermediate chambers; a sleeve mounted at opposite ends of said housing each of said sleeves projecting into an intermediate chamber, there being an exhaust conduit communicating with the interior of each of said sleeves, the interior of each of said sleeves being adapted for communicating with the intermediate chamber into which projected; a valve stem slidably mounted in said housing and projecting through said sleeve and through said chambers; a pair of spaced apart valves on said stem each being slidable into a sleeve or into one of said passages for closing the sleeve or passage engaged, said valves being so spaced apart that upon engagement of one of said valves in a sleeve, the other of said valves will engage in one of said passages.

2. A valve construction of the class described, comprising: a valve housing having an inlet chamber formed therein for the reception of fluid under pressure and having an inlet port communicating with said chamber, an end chamber in said housing positioned at one side thereof, an intermediate chamber between said inlet chamber and said end chamber and adapted to communicate with said inlet chamber through a passage at one side of said inlet chamber, there being a passage at the opposite side of said inlet chamber, a tubular sleeve on said housing closed at one end and projecting at its open end into said intermediate chamber, said intermediate chamber extending aronud the open end of said sleeve, the interior of said sleeve being in constant communication with said end chamber; a delivery conduit in constant communication with said intermediate chamber; a return conduit in constant communication with said end chamber, said end chamber being adapted for communicating through said sleeve with said intermediate chamber, a valve stem slidably mounted in said housing and projecting through said sleeve and said chamber, a valve spool mounted on said stem at one side of said inlet chamber and in spaced relation to a second valve spool mounted on said stem at the opposite side of said inlet chamber, said first-named valve being slidable into and engaging with said first-named passage for sealing against flow of fluid therethrough and said second-named valve being slidable in and engageable with said second-named passage for sealing against flow of fluid therethrough, communication of said intermediate chamber with said inlet chamber being closed and communication of said intermediate chamber with said end chamber being established upon slidable movement of said first-named valve into said first-named passage and, communication of said end chamber with said intermediate chamber being closed and communication of said intermediate chamber with said inlet chamber being established upon slidable movement of said first-named valve into said sleeve.

3. A valve construction of the class described, comprising: a valve housing having an inlet chamber formed therein for the reception of fluid under pressure and having an inlet port communicating with said chamber, an end chamber in said housing positioned at one side thereof, an intermediate chamber between said inlet chamber and said end chamber and adapted to communicate with said inlet chamber through a passage at one side of said inlet chamber, there being a passage at the opposite side of said inlet chamber, a tubular sleeve on said housing closed at one end and projecting at its open end into said intermediate chamber and terminating at its open end in spaced relation and opposed to one end of said first-named passage, the interior of said sleeve being in constant communication with said end chamber; a delivery conduit in constant communication with said intermediate chamber; a return conduit in constant communication with said end chamber, said end chamber being adapted for communicating through said sleeve with said intermediate chamber, a valve stem slidably mounted in said housing and projecting through said sleeve and said chamber, a valve spool mounted on said stem at one side of said inlet chamber and in spaced relation to a second valve spool mounted on said stem at the opposite side of said inlet chamber, said first-named valve being slidable into and engaging with said first-named passage for sealing against flow of fluid therethrough and said second-named valve being slidable in and engageable with said second-named passage for sealing against flow of fluid therethrough, communication of said intermediate chamber with said inlet chamber being closed and communication of said intermediate chamber with said end chamber being established upon slidable movement of said first-named valve into said first-named passage and, communication of said end chamber with said intermediate chamber being closed and communication of said intermediate chamber with said inlet chamber being established upon slidable movement of said first-named valve into said sleeve.

4. A valve construction of the class described, comprising: a valve housing having an inlet chamber formed therein for the reception of fluid under pressure and having an inlet port communicating with said chamber, an end chamber in said housing positioned at one side thereof, an intermediate chamber between said inlet chamber and said end chamber and adapted to communicate with said inlet chamber through a passage at one side of said inlet chamber, there being a passage at the opposite side of said inlet chamber, a tubular sleeve on said housing closed at one end and communicating at its open end with said intermediate chamber said intermediate chamber being of larger diameter than the open end of said sleeve, the interior of said sleeve being in constant communication with said end chamber; a delivery conduit in constant communication with said intermediate chamber; a return conduit in constant communication with said end chamber, said end chamber being adapted for communicating through said sleeve with said intermediate chamber, a valve stem slidably mounted in said housing and projecting through said sleeve and said chamber, a valve spool mounted on said stem at one side of said inlet chamber and in spaced relation to a second valve spool mounted on said stem at the opposite side of said inlet chamber, said first-named valve being slidable into and engaging with said first-named passage for sealing against flow of fluid therethrough and said second-named valve being slidable in and engageable with said second-named passage for sealing against flow of fluid therethrough, communication of said intermediate chamber with said inlet chamber being closed and communication of said intermediate chamber with said end chamber being established upon slidable movement of said first-named valve into said first-named passage and, communication of said end chamber with said intermediate chamber being closed and communication of said intermediate chamber with said inlet chamber being established upon slidable movement of said first-named valve into said sleeve.

5. A valve construction of the class described, comprising: a valve housing having an inlet chamber formed therein for the reception of fluid under pressure and having an inlet port communicating with said chamber, an end chamber in said housing positioned at one side thereof, an intermediate chamber between said inlet chamber and said end chamber and adapted to communicate with said inlet chamber through a passage at one side of said inlet chamber, there being a passage at the opposite side of said inlet chamber, a tubular sleeve on said housing closed at one end and communicating at its open end with said intermediate chamber said intermediate chamber being of larger diameter than the open end of said sleeve, the interior of said sleeve being in constant communication with said end chamber; a delivery conduit in constant communication with said intermediate chamber; a return conduit in constant communication with said end chamber, said end chamber being adapted for communicating through said sleeve with said intermediate chamber, a valve stem slidably mounted in said housing and projecting through said sleeve and said chamber, a valve spool mounted on said stem at one side of said inlet chamber and in spaced relation to a second valve spool mounted on said stem at the opposite side of said inlet chamber, said first-named valve being slidable into and engaging with said first-named passage for sealing against flow of fluid therethrough and said second-named valve being slidable in and engageable with said second-named passage for sealing against flow of fluid therethrough, communication of said intermediate chamber with said inlet chamber being closed and communication of said intermediate chamber with said end chamber being established upon slidable movement of said first-named valve into said first-named passage and, communication of said end chamber with said intermediate chamber being closed and communication of said intermediate chamber with said inlet chamber being established upon slidable movement of said first-named valve into said sleeve, and a sealing member on the periphery of said sleeve intermediate its end sealing against the inner surface of said intermediate chamber and preventing passage of fluid under pressure from said intermediate chamber around said sleeve.

6. A valve construction of the class described, comprising: a valve housing having an inlet chamber formed therein for the reception of fluid under pressure and having an inlet port communicating with said chamber, an end chamber in said housing positioned at one side thereof, an intermediate chamber between said inlet chamber and said end chamber and adapted to communicate with said inlet chamber through a passage at one side of said inlet chamber, there being a passage at the opposite side of said inlet chamber, an end cap secured to an end of said housing; a sleeve mounted on said cap and projecting inwardly of said intermediate chamber, said intermediate chamber extending around the open end of said sleeve, the interior of said sleeve being in constant communication with said end chamber; a delivery conduit in constant communication with said intermediate chamber; a return conduit in constant communication with said end chamber, said end chamber being adapted for communicating through said sleeve with said intermediate chamber, a valve stem slidably mounted in said housing and projecting through said sleeve and said chamber, a valve spool mounted on said stem at one side of said inlet chamber and in spaced relation to a second valve spool mounted on said stem at the opposite side of said inlet chamber, said first-named valve being slidable into and engaging with said first-named passage for sealing against flow of fluid therethrough and said second-named valve being slidable in and engageable with said second-named passage for sealing against flow of fluid therethrough, communication of said intermediate chamber with said inlet chamber being closed and communication of said intermediate chamber with said end chamber being established upon slidable movement of said first-named valve into said first-named passage and, communication of said end chamber with said intermediate chamber being closed and communication of said intermediate chamber with said inlet chamber being established upon slidable movement of said first-named valve into said sleeve.

7. A valve construction of the class described, comprising: a valve housing having an inlet chamber formed therein for the reception of fluid under pressure and having an inlet port communicating with said chamber, an end chamber in said housing positioned at one side thereof, an intermediate chamber between said inlet chamber and said end chamber and adapted to communicate with said inlet chamber through a passage at one side of said inlet chamber, there being a passage at the opposite side of said inlet chamber, an end cap secured to an end of said housing; a sleeve mounted on said cap and projecting inwardly of said intermediate chamber, said intermediate chamber extending around the open end of said sleeve, the interior of said sleeve being in constant communication with said end chamber; a delivery conduit in constant communication with said intermediate chamber; a return conduit in constant communication with said end chamber, said end chamber being adapted for communicating through said sleeve with said intermediate chamber, a valve stem slidably mounted in said housing and projecting through said sleeve and said chamber, a valve spool mounted on said stem at one side of said inlet chamber and in spaced relation to a second valve spool mounted on said stem at the opposite side of said inlet chamber, said first-named valve being slidable into and engaging with said first-named passage for sealing against flow of fluid therethrough and said second-named valve being slidable in and engageable with said second-named passage for sealing against flow of fluid therethrough, communication of said intermediate chamber with said inlet chamber being closed and communication of said intermediate chamber with said end chamber being established upon slidable movement of said first-named valve into said first-named passage and, communication of said end chamber with said intermediate chamber being closed and communication of said intermediate chamber with said inlet chamber being established upon slidable movement of said first-named valve into said sleeve, and a sealing member on the periphery of said sleeve intermediate its ends engaging the inner surface of said intermediate chamber for sealing against flow of fluid under pressure from said intermediate chamber around the periphery of said sleeve.

8. A valve construction of the class described, comprising: a valve housing having an inlet chamber formed therein; a port communicating with said chamber; a pair of intermediate chambers, one positioned at each side of said inlet chamber, a passage at opposite ends of said inlet chamber, each connecting said inlet chamber with one of said intermediate chambers, a pair of outlet delivery conduits, each in constant communication with one of said intermediate chambers; a sleeve mounted at opposite ends of said housing, each of said sleeves projecting into an intermediate chamber, there being an exhaust conduit communicating with the interior of each of said sleeves, the interior of each of said sleeves being adapted for communicating with the intermediate chamber into which projected; a valve stem slidably mounted in said housing and projecting through said sleeve and through said chambers; a pair of spaced-apart valves on said stem, each being slidable into a sleeve or into one of said passages for closing the sleeve or passage engaged, said valves being so spaced-apart that, upon engagement of one of said valves in a sleeve, the other of said valves will engage in one of said passages, there being an end chamber at each end of said valve housing, each of said end chambers being in communication with the interior of one of said sleeves.

9. A valve construction of the class described, comprising: a valve housing having an inlet chamber formed therein; a port communicating with said chamber; a pair of intermediate chambers, one positioned at each side of said inlet chamber, a passage at opposite ends of said inlet chamber, each connecting said inlet chamber with one of said intermediate chambers, a pair of outlet delivery conduits, each in constant communication with one of said intermediate chambers; a sleeve mounted at opposite ends of said housing, each of said sleeves projecting into an intermediate chamber, there being an exhaust conduit communicating with the interior of each of said sleeves, the interior of each of said sleeves being adapted for communicating with the intermediate chamber into which projected; a valve stem slidably mounted in said housing and projecting through said sleeve and through said chambers; a pair of spaced-apart valves on said stem, each being slidable into a sleeve or into one of said passages for closing the sleeve or passage engaged, said valves being so spaced-apart that, upon engagement of one of said valves in a sleeve, the other of said valves will engage in one of said passages, there being an end chamber at each end of said valve housing, each of said end chambers being in communication with the interior of one of said sleeves and there being passages for connecting said end chambers directly in communication with each other.

WALTER D. LUDWIG.

References Cited in the file of this patent

UNITED STATES PATENTS

| Number | Name | Date |
|---|---|---|
| 651,334 | Baker | June 12, 1900 |
| 658,915 | Jacobsen | Oct. 2, 1900 |
| 1,921,092 | Newton | Aug. 8, 1933 |
| 2,243,364 | Trautman | May 27, 1941 |
| 2,396,643 | De Ganahl | Mar. 19, 1946 |
| 2,436,992 | Ernst | Mar. 2, 1948 |